E. J. WELFFENS.
TRANSMISSION MECHANISM.
APPLICATION FILED OCT. 3, 1918.

1,391,290.

Patented Sept. 20, 1921.
4 SHEETS—SHEET 1.

INVENTOR:
Emile J. Welffens
By Wm Wallace White
ATTY

E. J. WELFFENS.
TRANSMISSION MECHANISM.
APPLICATION FILED OCT. 3, 1918.
1,391,290.
Patented Sept. 20, 1921.
4 SHEETS—SHEET 2.
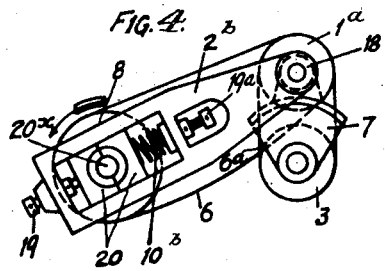
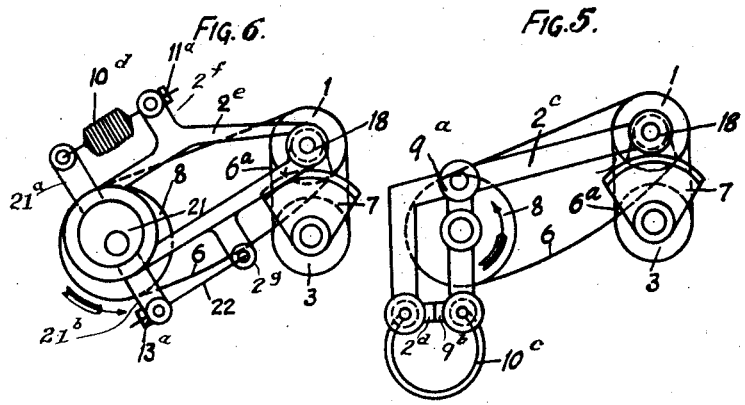
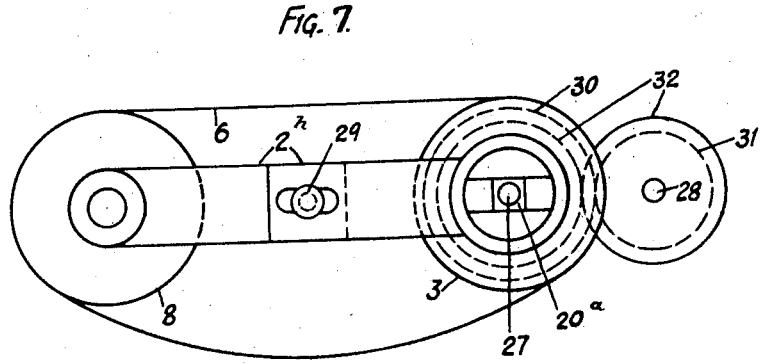
INVENTOR:
Emile J. Welffens
By Wm Wallace White
ATTY.

E. J. WELFFENS.
TRANSMISSION MECHANISM.
APPLICATION FILED OCT. 3, 1918.

1,391,290.  Patented Sept. 20, 1921.
4 SHEETS—SHEET 3.

INVENTOR:
Emile J. Welffens
By Wm Wallace White
ATTY.

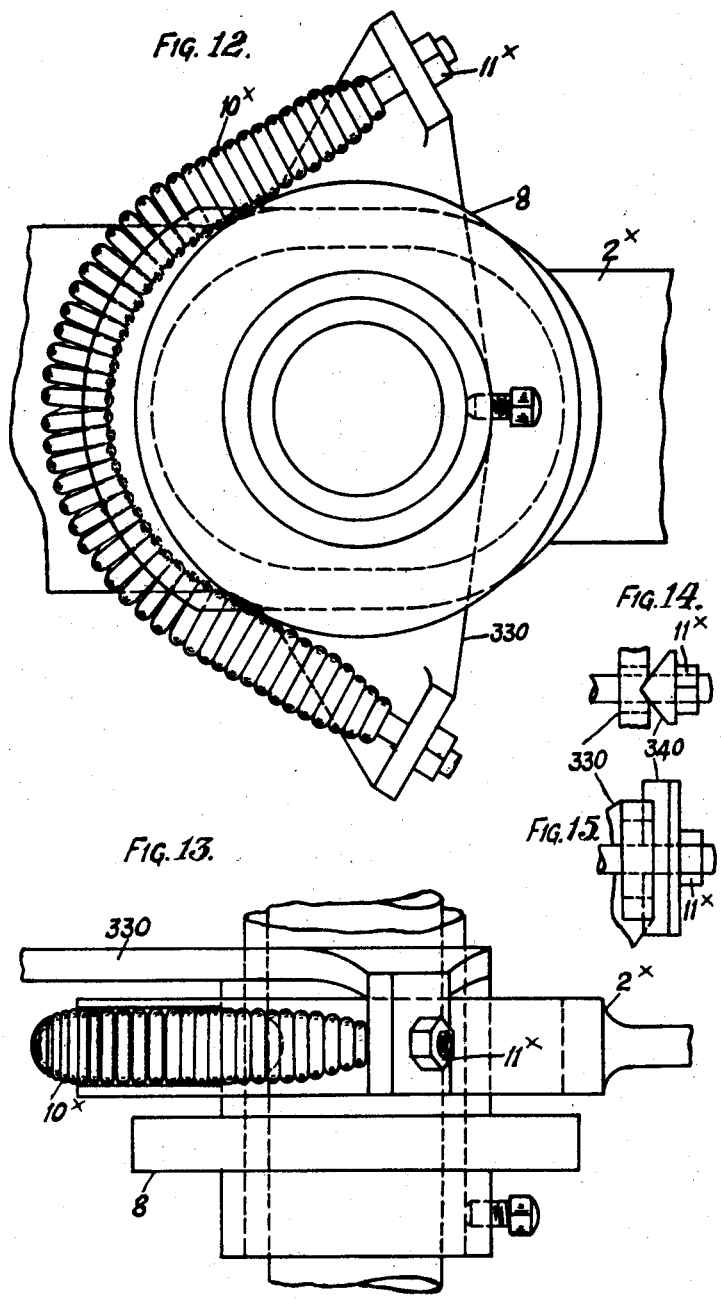

UNITED STATES PATENT OFFICE.

EMILE JOHN WELFFENS, OF WEST WITHINGTON, MANCHESTER, ENGLAND.

TRANSMISSION MECHANISM.

1,391,290.  Specification of Letters Patent.  Patented Sept. 20, 1921.

Application filed October 3, 1918. Serial No. 256,740.

*To all whom it may concern:*

Be it known that I, EMILE JOHN WELFFENS, a subject of the King of the Belgians, residing at 8 Mauldeth road, West Withington, Manchester, in the county of Lancaster, England, have invented new and useful Improvements Relating to Transmission Mechanism, of which the following is a specification.

This invention relates to transmission mechanism, and more particularly to that type of transmission used in spinning machines and known as swing gearing for the slubbing, roving and like frames, wherein the drive is transmitted from a driving wheel mounted for rotation upon a shaft which is stationary, to a driven wheel secured to a shaft which moves in a vertical path, the object of the invention being to provide an improved device of this character whereby a flexible transmitting member may be used and at the same time continuity of steady motion is maintained to a degree not possible with devices heretofore in use.

A further object of the invention is the provision of a device of the character set forth, in which the bobbin or flier gear will be caused to run uniformly in all positions of the vertically movable shaft, and the bobbin rail maintained in perfect alinement in its vertical guides.

A further object of the invention is the provision of the device of the character set forth in which the load on the flexible driving member is neutralized in such a manner that shocks and vibrations due to the reversal of the carriage or bobbin rail and to the constantly changing position of said rail are eliminated, so that they cannot be transmitted to the driving wheel of the swing.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figs. 4, 5 and 6 are diagrammatic side views of a device having two swinging drives, each of these figures illustrating the invention in a somewhat different form;

Fig. 7 is a diagrammatic side elevation of a device comprising two drives, only one of which swings, but both operating with constant center distances, without the provision of shock-absorbing devices;

Fig. 12 is an end view, broken away, illustrating an embodiment of the invention in which a free and floating connection between the movable and stationary parts of the machine is provided;

Fig. 13 is a broken away plan view of the structure shown in Fig. 12; and,

Figs. 14 and 15 are respectively a detail plan and an end elevation of a means for suspending the spring shown in Figs. 12 and 13 to its supporting bracket.

The same characters of reference designate the same parts in the different figures of the drawings.

Figure 1:
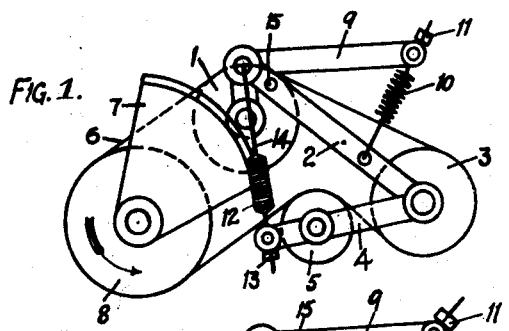
Figures 1, 2 and 3 are diagrammatic side views of a single drive swing embodying the present invention, each of these figures illustrating a modification of the shock absorbing means.

Referring to the drawings, and especially to Figs. 1 to 10 inclusive, 8 designates a driving wheel, which is mounted loosely for rotation on a stationary shaft (not shown), said wheel forming a part of the usual differential that controls the winding speed, that is to say, the excess speed of the bobbins over the fliers. 3 designates a driven wheel adapted to receive its motion by means of a flexible driving member or chain 6 from the driving wheel 8. The wheel 3 is secured to one of the bobbin driving shafts which are movable with the bobbin rail as the latter moves in vertical guides. The structure by which the bobbin rail is caused to move vertically is well known by those skilled in the art, and in the interest of clearness of illustration, such structure has been omitted from the drawings.

Referring now more particularly to Figs.

1 and 2, the reference character 2 designates a thrust link which is pivotally secured at one end to the driven shaft carrying the wheel 3, and which link carries at its opposite end a pivotally mounted bell crank lever 9, on one arm of which is pivotally mounted a jockey wheel 1 engaging the inner side of the flexible driving member 6. The pintle on which the jockey wheel 1 is mounted contacts with a cam member 7, which is secured to a fixed portion of the machine and the "contour" of which cam is calculated to compensate for the angular oscillations of the driving wheel 3 in its vertical movement. A second thrust link or arm 4 is pivotally carried on the shaft of the driven wheel 3 and is provided intermediate its ends with a pintle on which is mounted for rotation a jockey wheel 5 which engages the outer side of the flexible driving member or chain 6. In the form shown in Fig. 1, the free end of the link 4 has secured thereto one end of a coil spring 12, the opposite end of which merges into a rod 14 which is secured to the link 2 at the pivotal point of the bell crank lever 9. The connection of the spring 12 with the link 4 is made adjustable by means of a nut 13, whereby the tension of the spring may be regulated to suit the "load." A second coil spring 10 is secured to the link 2 intermediate its ends, the opposite end of said spring being adjustably connected by means of a nut 11 with the free end of the longer arm of the bell crank lever 9. In the modified form shown in Fig. 2, the extra spring 12 is omitted, and the spring 10, instead of being connected to the link 2, is lengthened and connected to the free end of the link 4. A transversely extending lug or pin 15 is provided on the link 2 to serve as a stop for the bell crank 9 when the device is at rest.

Figure 3:
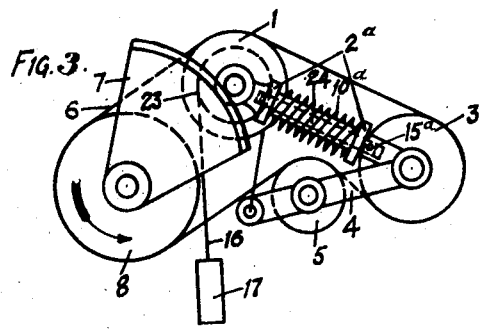

In the modification shown in Fig. 3 the bell crank is dispensed with, and the jockey wheel 1 is carried by the upper member of a two-part link 2$^a$, said upper member carrying an extension or bar 24 the lower end of which slidably engages an axially extending opening in the lower member of the link 2$^a$, and is provided with a transversely extending pin 15$^a$ that engages a slot in the walls of said lower member for limiting the movement of the upper member of the link. The upper and lower members of the link 2$^a$ are each provided with a shoulder or boss, and a coil spring 10$^a$ encircles the connecting bar 24 and abuts at its ends against the shoulders of the upper and lower members respectively, the tension of the spring thus tending to maintain the members of the link 2$^a$ in extended relation. In this form of the device, a weight 17 is used for counterbalancing the weight of the link 4, said weight being connected by means of a cable 16 which passes over a pulley 23 mounted to rotate freely on the pintle or stud carrying the jockey wheel 1, the opposite end of the cable being connected to the free end of the link 4. This construction possesses the advantage that in case of any deviation of the shaft of the driven wheel 3 from the horizontal, the lower member of the link 2$^a$ would merely rotate or swivel on the connecting bar 24, thereby avoiding any warping strain.

Figure 2:
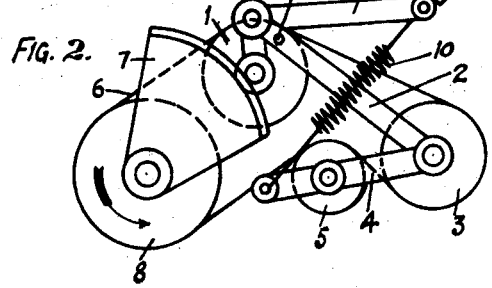

Referring now generally to Figs. 4, 5 and 6, all of which illustrate a construction of two swinging drives, but showing different constructions of shock absorbing means. In the form shown in Fig. 4, the main shaft 20$^x$ carrying the driving wheel 8 is mounted in a split bearing block 20, which is slidable in an opening in the link or arm 2$^b$, the relative position of the bearing in said opening being determined by an adjusting bolt 19 passing longitudinally through one end of the arm 2$^b$ and contacting at its inner end with the block 20, a cushioning spring 10$^b$ being inserted between the opposite end of the block and the inner end wall of the opening in the arm 2$^b$. A second adjusting bolt 19$^a$ passes through said inner end wall and carries an abutment or seat for the spring 10$^b$ whereby the tension of said spring may be adjusted to suit the load on the machine. The jockey wheel 1$^a$ in this case is a double pulley and receives its motion by means of a flexible member or chain 6 from wheel 8 and transmits it to driven wheel 3 by means of a second chain or other flexible transmitting member 6$^a$. The cam 7 in the form of the device shown in Figs. 4, 5 and 6 is disposed between the axes of the wheels 3 and 1, instead of between the axes of wheels 8 and 1 as shown in Figs. 1, 2 and 3, and the wheel 1 is provided with a traveling bearing 18 in contact with the cam 7. It will be obvious, of course, that either or both of these members 7 and 18 may, if desired, be made adjustable in any well-known manner so as to vary the distance between the axes of the wheels 1 and 3.

The structure shown in Fig. 5 differs from that of Fig. 4 only in the manner of connecting the wheels 8 and 1. In this form, the thrust link 2$^c$, instead of being connected directly to the shaft carrying the wheel 8, is attached to an auxiliary link or arm 9$^a$ which is pivotally mounted intermediate its ends on said shaft. To the free end of this link 9$^a$ is secured one end of a band spring 10$^c$, the other end of which is secured to the free end of an angular extension of the link 2$^c$, said angular extension and the link 9$^a$ being provided at their free ends with abutting lugs 2$^d$ and 9$^b$, respectively, thereby to limit the action of the spring 10$^c$.

In the form shown in Fig. 6, the thrust link 2$^e$ is in the form of a loop having at opposite sides thereof a pair of perforated projections or lugs 2$^f$ and 2$^g$ respectively. The shaft on which the driving wheel 8 is mounted passes eccentrically through a bearing 21 which is located within the loop of the thrust member 2$^e$, said bearing being provided with a pair of laterally extending perforated lugs 21$^a$ and 21$^b$, the latter of which is connected by means of a rod 22 with the lug 2$^g$ of the thrust link and is adjusted to the proper distance from said lug by means of the adjusting nut 13$^a$. The lug 21$^a$ is connected to the lug 2$^f$ of the thrust link by means of a coil spring 10$^d$, the tension of which is also adjustable by means of the adjusting nut 11$^a$.

Figure 8:
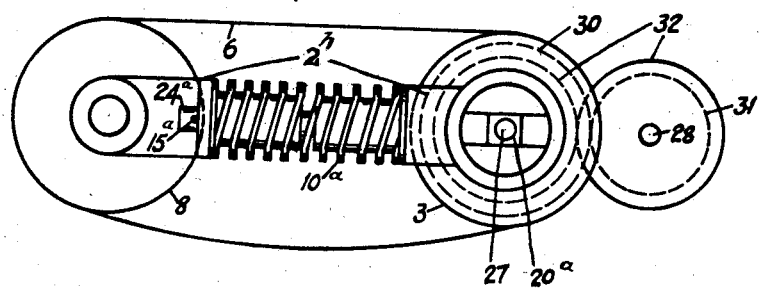
Figs. 8 and 9 are diagrammatic side views illustrating a structure similar to that shown in Fig. 7, but showing two different forms of shock-absorbing devices applied thereto.
Figure 9:
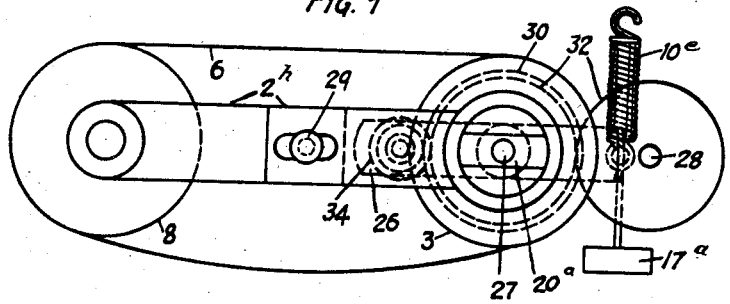
Figure 10:
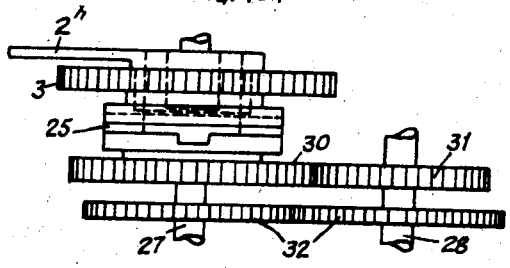
Figs. 10 and 11 are plan views, broken away, respectively of the structures shown in Figs. 8 and 9.
Figure 11:
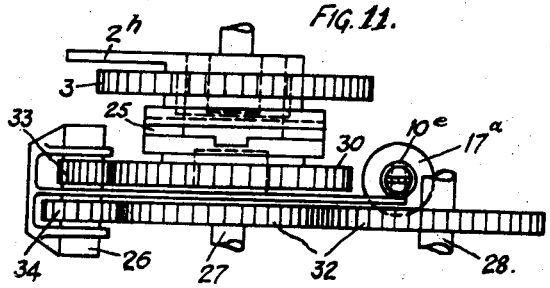

In the form shown in Figs. 7, 8, and 9, the two wheels 8 and 3 are of equal diameter and are carried at opposite ends of a two-part thrust arm 2$^h$. In Figs. 7 and 9, one part of the arm is shown slidable on the other by means of a slot and pin connection, as shown at 29. By this arrangement epicyclic irregularities are avoided. The second drive, as shown more clearly in Fig. 10, is mounted upon bobbin shafts 27 and 28, the ratio of the gears being such as to give the required difference in speed between the driving wheel 8 and driven wheels 32. Gear 30 is loosely mounted on shaft 27 and carries on one side thereof one member of an Oldham coupling 25, the other member being carried by the wheel 3, whereby motion is imparted from wheel 3 through gear 30 to gear 31 secured to shaft 28, and through the equal gears 32 on shafts 27 and 28 to said shaft 27. By the use of the Oldham or sliding coupling, center distance variations are neutralized. It will, of course, be obvious that when no difference in speed between the wheel 8 and gear 32 is desired, the gears 30 and 31 may be omitted and the clutch member secured directly to gear 32 on shaft 27. The connection of the thrust arm 2$^h$ shown in Figs. 7 to 13 inclusive, with the shaft 27 is by means of a bearing block 20$^a$ mounted on the shaft and slidable in a slot in the arm 2$^h$. In the structure shown in Fig. 7, however, no shock absorbing devices are present.

The device illustrated in Fig. 8 is similar to that shown in Fig. 7, except that provision is made for absorbing shocks and also for preventing warping strain. The link 2$^h$ in this case is similar in construction to that shown in Fig. 3; that is to say, the two members of the link are connected by a rod or bar 24$^a$ projecting from one member and slidable in an axial opening in the other member, the sliding movement being limited by a pin and slot connection 15$^a$, a spring 10$^a$ encircling the members of the link and abutting at its ends against shoulders carried by said members.

The device illustrated in Fig. 9 is similar to that shown in Fig. 7, but in addition a device for giving aggregate motion is incorporated for imparting the desired shock absorbing qualities. In this form of the device, a pair of pinions 33 and 34 secured to a common pintle or stud are provided, said pintle being carried by one end of an arm 26, which is pivotally mounted midway of its length on the shaft 27. The opposite end of the arm 26 carries a weight 17$^a$, which serves to counterbalance the weight of the pinions 33 and 34 and retain the arm in horizontal position when at rest. The weighted end of the arm is attached to one end of a coiled spring 10$^e$, the opposite end of which is of hook formation, whereby it may be attached to any suitable portion of the carriage or bobbin rail (not shown). From this construction, it will be seen that when the device is working steadily, the arm 26 will remain horizontal and thus retain the pinions 33 and 34 in their normal position shown in dotted lines in Fig. 9, and will transmit motion from the gear 30 to the gear 32 on shaft 27 (see Fig. 11). Any irregularity of speed, however, of either gear 30 or 32 will cause pinions 33 and 34 momentarily to roll along on gears 30 and 32 in a clockwise or anticlockwise direction, thus absorbing shocks and irregularities of speed.

As to the chain or equivalent drive and the Oldham coupling illustrated in the structures shown in Figs. 7 to 11, it may be pointed out that the maximum displacement of the traveling member of coupling 25 from its central position may be kept down to half the extreme center distance variation by giving the chain or other drive such a constant center distance that there will be no displacement of the traveling member when the carriage or bobbin rail is midway between the two positions which cause the center distance to vary from maximum to minimum or vice versa. For instance, if the extreme center distance variation due to the list were one inch, the maximum displacement of the traveling member 25 from its central position would not be more than half an inch during the up and down motion of the carriage or bobbin rail.

In Figs. 12 and 13 is illustrated a construction whereby all rigidity of connection between the stationary and moving parts of the frame is completely eliminated. In this structure the wheel 8 and its shaft are, as in all of the other figures, a part of the stationary portion of the machine, while the swinging arm 2$^x$ carries the movable element. This arm may be either a solid arm, or a two-part adjustable arm, as shown in any of the other figures. In this instance, however, the arm is entirely free from any stationary portion of the frame, it being cradled in a spring 10$^x$, the ends of which are adjustably secured to a bracket 330 carried by a fixed portion of the frame, the tension of the spring being adjustable by means of nuts 11ˣ to suit the load on the driving member. As will be clearly seen from Fig. 12, the arm 2ˣ is provided with an enlarged elongated opening surrounding the shaft carrying the driving wheel 8, so that said arm may have a free epicyclic motion about said shaft, said motion being limited only by the tension of the spring 10ˣ. In order to secure the maximum freedom of motion and displacement, knife edge supports for the spring, such for instance as shown in Figs. 14 and 15, may be provided. As shown in these figures, the openings in the lugs of the bracket 330 through which the ends of the spring pass are elongated, and each of said lugs is provided on its outer side with a V-shaped groove, wherein is seated the knife edge of a thrust piece 340, against which latter the nuts 11ˣ abut. It will be obvious that with this construction the chain or other flexible member for transmitting motion from the driving wheel 8 to the driven wheel is the only positive connection between the stationary and moving parts of the frame, and the pull on this member will be balanced by the action of spring 10ˣ against arm 2ˣ, while at the same time the structure is rendered truly shock absorbing. Moreover, this connecting member, although insuring a positive drive, will, because of its flexibility, automatically adjust its position to that of the driving and driven wheels, while its tight side is rendered elastic by the tension of the spring 10ˣ. It will also be observed that the free and floating suspension of link 2ˣ, in combination with the knife-edge suspension of spring 10ˣ, will permit link 2ˣ to take up any position into which it may be forced by the action of the bobbin rail, without creating any strains in the arm or in the motion transmitting mechanism between the driving and driven members.

From the foregoing description, taken in connection with the drawings, it will be observed that in all forms of the device herein illustrated, the effects of faulty alinement and play in the guides of the bobbin rail, as well as all irregularities, shocks and vibrations are eliminated before they can be carried, by repercussion, to the driving wheel. I am aware that means have heretofore been suggested for eliminating the irregularities caused by the angular oscillation of the driven wheel, but so far as I am aware, no means has heretofore been provided for eliminating irregularities resulting from other causes, such as variations in load, or the hammer effect engendered by the reversal of motion of the bobbin rail carriage, so as to prevent their recoil upon the differential and governing gear.

While I have described in detail the structures herein illustrated, it is to be understood that I do not thereby limit my invention to the precise features shown, as I am aware that many mechanical changes and modifications may be made therein without departing from the spirit and scope of the invention as set forth in the claims appended hereto.

Having thus described my invention, what I claim is:

1. In a motion transmitting device comprising a driving member rotatable in a fixed plane, a driven member adapted to reciprocate in a path tangential to said driving member, and flexible means for transmitting motion from said driving member to said driven member, the combination of means for supporting said driven member in driving relation to said driving member and automatically adjustable during the travel of said driven member for neutralizing the variations of distances between the axes of said driving and driven members.

2. In a motion transmitting device comprising a driving member rotatable in a fixed plane, a driven member adapted to reciprocate in a path tangential to said driving member, and flexible means for transmitting motion from said driving member to said driven member, the combination of means for supporting said driven member in driving relation to said driving member and automatically adjustable during the travel of said driven member for neutralizing the variations of distance between the axes of the driving and driven members, and tension means carried by said supporting means for preventing the transmission of shocks from one of said members to the other.

3. In a motion transmitting device comprising a driving member rotatable in a fixed plane, a driven member adapted to reciprocate in a path tangential to said driving member, and flexible means for transmitting motion from said driving member to said driven member, the combination of means for supporting said driven member in driving relation with said driving member and comprising a plurality of parts movable one relatively to the other, the relative position of said parts being automatically adjustable during the travel of the driven member for neutralizing the variations of distance between the axes of the driving and driven members.

4. In a motion transmitting device comprising a driving member rotatable in a fixed plane, a driven member adapted to reciprocate in a path tangential to said driving member, and flexible means for transmitting motion from said driving member to said driven member, the combination of means for supporting said driven member in driving relation with said driving member and comprising a plurality of parts movable one relatively to the other, the relative position of said parts being automatically adjustable during the travel of the driven member for neutralizing the variations of distance between the axes of the driving and driven members, and tension means carried by said supporting means for preventing the transmission of shocks from one of said members to the other.

5. In a motion transmitting device comprising a driving member rotatable in a fixed plane, a driven member adapted to reciprocate in a path tangential to said driving member, and flexible means for transmitting motion from said driving member to said driven member, the combination of means for supporting said driven member in driving relation with said driving member, said supporting means being pivotally connected with said driving member and comprising a plurality of parts automatically movable one relatively to the other during the reciprocation of said driven member for neutralizing the variations of distance between the axes of the driving and driven members.

6. In a motion transmitting device comprising a driving member rotatable in a fixed plane, a driven member adapted to reciprocate in a path tangential to said driving member, and flexible means for transmitting motion from said driving member to said driven member, the combination of means for supporting said driven member in driving relation with said driving member, said supporting means being pivotally connected with said driving member and comprising a plurality of parts automatically movable one relatively to the other during the reciprocation of said driven member for neutralizing the variations of distance between the axes of the driving and driven members, and tension means connected with said supporting means for preventing transmission of shocks from one of said members to the other.

7. In a motion transmitting device comprising a driving member rotatable in a fixed plane, a driven member adapted to reciprocate in a path tangential to said driving member, and flexible means for transmitting motion from said driving member to said driven member, the combination of a two-part supporting arm for said driven member, one part thereof being pivotally connected with said driving member, the parts of said arm being automatically slidable relatively to each other during the reciprocations of said driven member for neutralizing the variations of distance between the axes of the driving and driven members.

8. In a motion transmitting device comprising a driving member rotatable in a fixed plane, a driven member adapted to reciprocate in a path tangential to said driving member, and flexible means for transmitting motion from said driving member to said driven member, the combination of a two-part supporting arm for said driven member, one part thereof being pivotally connected with said driving member, the parts of said arm being automatically slidable relatively to each other during the reciprocations of said driven member for neutralizing the variations of distance between the axes of the driving and driven members, and tension means for normally retaining the parts of said arm in proper relative position.

In testimony whereof I have signed my name to this specification.

EMILE JOHN WELFFENS.

Witnesses:
S. W. GILLETT,
HERBERT ROWLAND ABBEY.